Aug. 28, 1923.
M. J. OWENS
SHEET GLASS DRAWING MECHANISM
Filed April 27, 1922
1,466,457
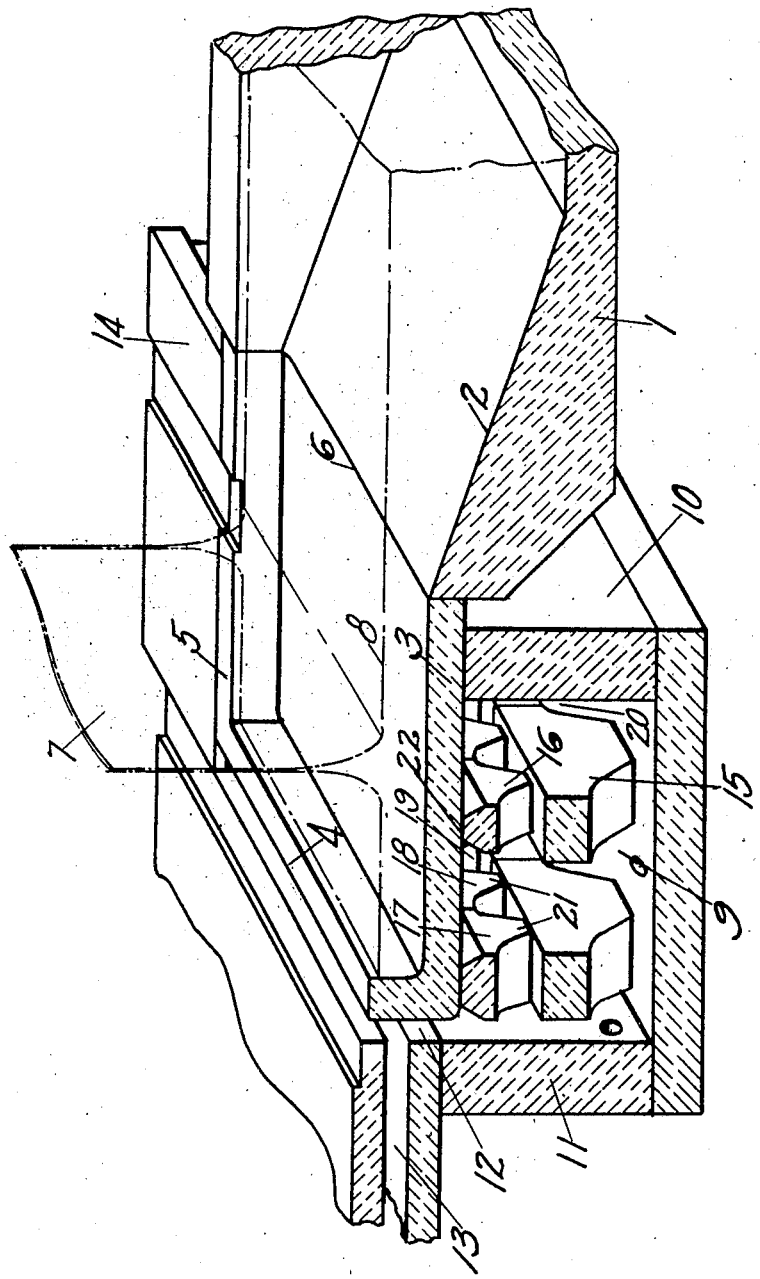
INVENTOR
Michael J. Owens
By C.A. Rowley
ATTORNEY Patented Aug. 28, 1923.

1,466,457

UNITED STATES PATENT OFFICE.

MICHAEL J. OWENS, OF TOLEDO, OHIO, ASSIGNOR TO THE LIBBEY-OWENS SHEET GLASS COMPANY, OF TOLEDO, OHIO, A CORPORATION OF OHIO.

SHEET-GLASS-DRAWING MECHANISM.

Application filed April 27, 1922. Serial No. 556,848.

*To all whom it may concern:*

Be it known that I, MICHAEL J. OWENS, a citizen of the United States, residing at Toledo, in the county of Lucas and State of Ohio, have invented new and useful Improvements in Sheet-Glass-Drawing Mechanism, of which the following is a specification.

This invention relates to a sheet glass drawing apparatus and more particularly to an improved form of support for the pot or container holding the molten glass from which the sheet is drawn.

In a sheet drawing apparatus of the Colburn type, as set forth for example in the patent to I. W. Colburn, 1,248,809, granted Dec. 4, 1917, the molten glass from which the sheet is drawn is carried in a shallow receptacle or draw-pot, beneath which is a heating chamber for maintaining the glass at the proper drawing temperature. There must be supports within the heating chamber for this draw-pot, and these supports are in the form of arches, to allow for the free passage therethrough of the hot gases. As shown for example in Patent 1,248,809, referred to above, the upper member or tier of each of these supports has the supporting arches turned upwardly so that the pot is carried by a series of spaced legs or posts, between which pass the hot gases. This has resulted in unequal heating of the glass within the pot, there being cooler areas above the contact points of the supporting posts and hotter areas therebetween caused by the closer contact of the heating gases. Since the sheet is drawn from the pot on a line parallel to the series of supporting posts, there will result alternate hotter and cooler areas across the width of the sheet.

The object of the present invention is to avoid this unequal heating of the molten glass in the pot, and the consequent inequalities in the glass sheet. This result has been accomplished by turning over the upper supporting member so that the arches point downwardly and the open gas passages are removed from direct contact with the pot. The upper uninterrupted side of the supporting member is in continuous contact with the pot, and the edges of this member are beveled off to make a narrower contacting edge. Any cooling effect that this edge has upon the molten glass will be equally distributed across the pot, and hence will not result in inequalities in the sheet.

The invention will be better understood from the following detailed description of one approved form of the apparatus.

The accompanying drawing is a perspective view of the draw-pot and its supports, the nearer side being broken away in longitudinal vertical section.

At 1 is shown the delivery end of the cooling or refining chamber of a continuous tank furnace. The upwardly sloping bottom wall 2 of this tank joins flush with the bottom of the shallow draw-pot 3, which holds the glass from which the sheet 7 is drawn. The draw-pot 3 is closed at the far end by wall 4, similar to the side-walls 5, and the inner end is open at 6 to communicate with the tank 1. The outline of the sheet 7 is indicated in dotted lines; the level of the molten glass in the draw-pot and tank also being indicated by dotted lines as at 8.

Beneath the draw-pot and extending beyond the two sides and the closed end thereof, is a heating chamber indicated generally at 9. The ends and sides of this chamber are closed, and the open front end of the pot is supported on the front wall 10 of this chamber 9. The rear wall 11 of chamber 9 is spaced somewhat beyond the farther end of the pot, leaving a vertical passage 12 for the heated gases to pass up around the end of the pot and pass out through flue 13. The side extensions of chamber 9 beyond the sides of the pot are closed at the top by slabs 14 thus forming heating chambers extending part way up around the sides of the pot to prevent the undue cooling of the molten glass near these edges.

The draw-pot 3 is supported within the chamber 9 beneath its rear edge and at an intermediate point by transverse arched supports or stools 15 and 16. These are silica blocks or similar refractory material, and may be formed as a single block extending the width of the pot, or may be built up of a series of separate blocks such as 17, 18, 19, etc. In prior constructions the upper stool 16 has been positioned with the continuous flat side down and resting upon the upper continuous face of the lower stool 15. This left the open arches 20 adjacent the floor of the chamber, and an upper series of arches adjacent the bottom of the pot between the series of spaced legs or posts 21 upon which the pot rested. This construction is shown in the Colburn patent, 1,248,809, referred to above, and in several similar patents. It has been found that cooler areas in the molten glass were formed above the posts 21, with alternate hotter areas therebetween corresponding to the open arches through which pass the hot gases.

According to the present invention, the upper stools 16 have been inverted, as shown in the drawing, so that the legs 21 rest upon the lower stools 15, and the pot is carried by the continuous flat upper surface 22 of the stool. Also the side edges of the stool are beveled off so as to leave the upper edge 22 of the stool as narrow as is practicable to support the draw-pot. While this supporting edge 22 doubtless has a cooling effect upon the glass thereabove, this influence is parallel to the sheet source and distributed equally across the width of the pot, and affects the temperature of the sheet 7 uniformly at all transverse points.

This construction eliminates the alternate hot and cold areas across the width of the pot, which caused similar temperature variations and consequent irregularities in the sheet. The sheet is drawn from glass of a uniform temperature and plasticity at all points across the pot, has a uniform thickness, and the formation of waves and wrinkles is largely eliminated.

Claims:

1. In a sheet glass drawing mechanism, a draw-pot supporting stool having an upper continuous uninterrupted pot-supporting surface, and having gas passages formed through its lower portion.

2. In a sheet glass drawing machine, a draw-pot supporting stool having its under surface cut away at intervals to form a series of open arches, and its upper pot-supporting surface continuous and uninterrupted.

3. In a sheet glass drawing machine, a draw-pot supporting stool having its under surface cut away at intervals to form a series of open arches, the upper portion being beveled at the edges to form a narrow continuous uninterrupted pot-supporting surface.

4. In a sheet glass drawing machine, in combination with a draw-pot containing the molten glass from which the sheet is drawn, a heating chamber beneath the draw-pot, and transverse supports for the pot within the chamber, each support having a continuous uninterrupted supporting contact with the pot, there being passages for the hot gasses through the support spaced below the upper pot-supporting surface.

5. In a sheet glass drawing machine, in combination with a draw-pot containing the molten glass from which the sheet is drawn, a transverse supporting member beneath the pot positioned parallel to the line of draw of the sheet, the member having its under side cut-away to form a series of open arches, and its upper pot-supporting side in continuous unbroken contact with the pot.

6. In a sheet glass drawing machine, in combination with a draw-pot containing the molten glass from which the sheet is drawn, a transverse supporting member beneath the pot positioned parallel to the line of draw of the sheet, the member having its under side cut-away to form a series of open arches, and its upper pot-supporting side beveled at the edges leaving a narrow continuous strip in unbroken contact with the pot.

Signed at Toledo, in the county of Lucas, and State of Ohio, this 17th day of April, 1922.

MICHAEL J. OWENS.